PREPARE ORGANOSOL COMPRISING 7 TO 30 PARTS BY WEIGHT OF A POLYETHYLENE RESIN AND 100 PARTS BY WEIGHT OF A VINYL CHLORIDE RESIN.

↓

COAT METAL SURFACE WITH THE ORGANOSOL.

↓

BAKE AT ABOUT 275-320° F. FOR ABOUT 10-20 MINS.

↓

ALLOW TO COOL.

3,183,117
COATING COMPOSITION AND COATING METAL THEREWITH
Henry Yuska, Kew Gardens, N.Y., John E. Lynch, Emerson, N.J., and Herbert Barry, Rego Park, N.Y., assignors to Interchemical Corporation, New York, N.Y., a corporation of Ohio
Filed Apr. 8, 1960, Ser. No. 20,808
4 Claims. (Cl. 117—132)

Our invention relates to new and useful organosol compositions, to the method of preparing the compositions, to articles coated with the compositions, and to the method of coating those articles.

The term "organosol" applies to high molecular weight materials (e.g. vinyl resin products); more specifically, to finely divided particles of the high molecular weight materials suspended in non-solvent media.

In general, materials that have high molecular weight have high viscosity in solution and consequently they have low solids at spray application viscosity. The use of organosols overcomes this disadvantage; i.e. the organosol technique provides a practical method for formulating high molecular weight materials at high solids at spray application viscosity. This minimizes solvent fume elimination and affords economies on solvent and shipping. Furthermore, when organosols are applied by spray to metal surfaces, (e.g. tinplate), upon application of heat, fusion occurs immediately, thereby minimizing sagging and runs. The resulting organosol film appears homogeneous and continuous, has good permeability characteristics, and adheres well to the tinplate.

However, organosol formulations were found to have several disadvantages when applied to metal surfaces; i.e., the high temperature bakes and long lengths of time required to obtain proper fusing of the organosol and good surface adhesion resulted in copious, obnoxious fuming and poor blush resistance.

We now find that these disadvantages of organosol formulations can be eliminated or greatly minimized by the addition of a polyethylene resin thereto.

For example, by the incorporation of polyethylene, satisfactory adhesion to metal surfaces is obtained at bakes of 350° F. whereas organosol formulations without polyethylene require bakes of 400° F. Where the organosol formulation is to be applied to a tinplate surface, e.g. the inside surface of tin cans, and the outside of the can has already been lithographed, applying the organosol formulation at a lower bake is most desirable.

The blush resistance and adhesion of the coating at 350° F. bakes when polyethylene is present is satisfactory; whereas in the absence of polyethylene resin blush and adhesion are poor at 350° F. bakes.

The lower bakes result in much less fuming of the organosol whereas at 400° F., fuming is copious and obnoxious. Baking the coating at from about 350° F. to about 375° F. for about 10 to 20 minutes gives satisfactory results.

Our discovery was quite unexpected as polyethylene has not been considered heretofore as an agent for lowering the curing temperature of organosol coatings.

The particular grade of polyethylene resin used is not critical, but lower molecular weight polyethylenes, e.g. polyethylene A-C, grade 6A M.W. 2000, seem more desirable. (Polyethylene A-C, grade 6A M.W. 2000 is a commercially available powdered polyethylene produced by Semet-Solvay Petrochemical, Division of Allied Chemical Corporation.)

Another commercially available higher molecular weight polyethylene resin is Polyethylene DYGT, M.W. 7000 which is a commercially available polyethylene in pellet form produced by Bakelite Company, Division of Union Carbide and Carbon Corporation. In the case of Polyethylene DYGT it was found desirable to use the following laboratory method of obtaining a desirable particle size, 60 grams of polyethylene resin were dissolved in a naphtha having a K.B. valve of 36 and a boiling range of 200–232° F. by the application of heat. The hot solution was then poured into cold enamel trays and permitted to cool. The crystallized polyethylene was then permitted to air dry for several days, and upon drying, it was ground with mortar and pestle in order to obtain a still smaller particle. The powder that was obtained from the grind was then suitable for use with the organosol.

With respect to amount of polyethylene resin used, it was found while not critical, best results were obtained when seven to thirty parts by weight of polyethylene resin were formulated for every 100 parts of vinyl resin used.

The organosols contemplated by this invention include a vinyl resin dispersed phase, a plasticizer, a non-solvent organic dispersion medium, and any of a number of standard heat and light stabilizers. Vinyl resins providing desirable dispersed phases normally include vinyl chloride homopolymers and copolymers. The organosol may employ any of the conventional plasticizers used in existing organosols. These include phthalates such as methyl phthalate and dioctyl phthalate, adipates such as dioctyl adipate; citrates such as tricresyl phosphate and 2-biphenyl diphenyl phosphate as well as chlorinated biphenyls and methyl phthalyl ethyl glycollate, and combinations of the above. Other plasticizers which exhibit compatibility with polyvinyl chloride and which may be used will be readily apparent to those skilled in the art. While xylene is used as the organic liquid dispersion medium in the examples which follow, other conventional organosol dispersion media may be used and these will be readily obvious to those skilled in the art. These include toluene, xylene, methyl isobutyl ketone, alkanols and petroleum naphthas. The properties required of the organic liquid are that the dispersed resin must be insoluble therein and the liquid must be sufficiently volatile to evaporate on curing. Among the conventional stabilizers which act to prevent the heat and/or light deterioration of the dispersed vinyl resins are barium stabilizers such as barium ricinoleate, cadmium stabilizers such as cadmium naphthenate, lead stabilizers such as lead orthosilicate, strontium stabilizers such as strontium naphthenate as well as tin stabilizers.

While not critical, it has been found that for best reults, 2 parts by weight of vinyl resin is preferably used for every 1 part of plasticizer. It also has been found that for best results especially in spraying, the liquid organic dispersion medium should constitute 14 to 30% of the total compositon weight.

It will also be understood by those skilled in the art that other conventional organosol additives may be used in these formulations. These include pigments, fillers and thinners.

Preferable additives to the formulations of this invention are ethoxyline resins and melamine formaldehyde resins. The ethoxyline resins used in this invention are the reaction product of epichlorohydrin and Bisphenol A. This additive causes the baked film to have a desirable lighter color. The melamine formaldehyde resin improves the adhesion of the organosol coating to the metal surface. When the melamine formaldehyde resin is employed, it is also desirable to use a 10% solution of $H_3PO_4$ in ethylene glycol monomethyl ether. The use of the $H_3PO_4$ improves the curing of the melamine formaldehyde resin, thereby enhacing adhesion of the organosol composition to the metal surface. Each of the ethoxyline resin, melamine formaldehyde resin and the $H_3PO_4$ solution preferably constitutes 4 to 9% of the final organosol weight.

The following examples will illustrate the practice of this invention wherein a major proportion of a vinyl chloride resin is dispersed in a dispersion medium such as shown in the example:

Example I 43.2 parts by weight of vinyl chloride resin is added slowly with continuous stirring to 21.6 parts by weight of dioctyl phthalate, 17.4 parts of xylene, 1.7 parts of a heat and light stabilizer, 4 parts of EPON 562 (an ethoxyline resin produced by the reaction of epichlorohydrin and Bisphenol A having an epoxide equivalent weight of 140–165 and an average molecular weight of 300 marketed by Shell Chemical Corporation), 8 parts of Cymel 245–8 (a butylated melamine formaldehyde resin—50% solids in butanol marketed by American Cyanamid Corporation) and 4 parts of a 10% solution of $H_3PO_4$ in ethylene glycol monomethyl ether. The mixture is then stirred for 15 minutes and 7.5 parts by weight of a polyethylene resin having a M.W. of 7000 are added and the mixture is ground on a ball mill for 24 hours. The resulting organosol has a solid content of 75% of the total weight. Sufficient xylene is added to reduce the solid content to 70%. The organosol is then sprayed onto a tin plated panel and baked at 350° F. for 10 minutes. The cured film is compared to a similar cured film of an organosol having the same ingredients without the polyethylene resin. The film containing the polyethylene displayed better blush resistance and adhesion than the film without the polyethylene.

Example II

Example I is repeated using the following proportions:

|   | G. |
|---|---|
| Vinyl chloride | 755.7 |
| Ferro 400 (a strontium 2-ethyl hexoate stabilizer marketed by Ferro Chemical Company) | 29.7 |
| Dioctyl phthalate | 377.8 |
| Xylene | 303.4 |
| Epon 562 | 70.3 |
| Cymel 245–8 | 140.6 |
| 10% $H_3PO_4$ in ethylene glycol monomethyl ether | 70.3 |
| Polyethylene resin M.W. 7,000 | 30 |

The resulting organosol has a 77% solids content. Sufficient xylene is added to reduce the solids content to 70% and a cured film of the organsol is prepared in accordance with the procedure of Example I.

Example III

Example I is repeated using the same ingredients and proportions as Example I except that 24 parts by weight of the polyethylene resin are used instead of 7.5 parts. The blush resistance and adhesion of the cured film are considerably improved over that of the cured film of Example I.

Example IV

Example III is repeated using the same ingredients and proportions except that a polyethylene resin having a M.W. of 2,000 is used in place of the 7,000 M.W. polyethylene resin of Example III. The resulting cured film displays even better blush resistance and adhesion than does the film of Example III.

Example I is repeated using the same ingredients and proportions except that 39 parts of polyethylene resin is used in place of the 7.5 parts of said resin. The resulting resin displays the best blush resistance and adhesion.

The process is shown schematically in the drawing. Since certain obvious changes may be made in the above procedure and different embodiments of the invention could be made without departing from the scope thereof, it is intended that all matter contained in the above description shall be taken in connection with the accompanying claims and not in a limiting sense.

What is claimed is:

1. An organosol coating composition consisting essentially of
   (a) a volatile organic dispersion medium, consisting of about 14 to 30% by weight of the total composition,
   (b) a major proportion of a vinyl chloride resin dispersed in said dispersion medium,
   (c) a plasticizer for the vinyl chloride resin, the amount of plasticizer being about ½ the amount of said resin,
   (d) 4–9% of the final organosol weight of an ethoxyline resin produced by the reaction of Bisphenol A and epicholorohyrdin,
   (e) 4–9% of the final organsol weight of an alkylated melamine-formaldehyde resin, and
   (f) about 7 to 30 parts by weight of a polyethylene resin for every 100 parts by weight of the vinyl chloride resin.

2. A method of decorating a metal surface consisting essentially of
   (a) applying to said surface the organosol coating composition described in claim 1,
   (b) baking the coating at from about 350° F. to about 375° F. for about 10–20 minutes and
   (c) allowing the coating to cool.

3. The composition claimed in claim 1, wherein said polyethylene resin has a molecular weight of 7,000 or less.

4. A method of decorating a metal surface consisting essentially of
   (a) applying to said surface the organosol coating composition described in claim 3,
   (b) baking the coating at from about 350° F. to about 375° F. for about 10–20 minutes, and
   (c) allowing the coating to cool.

References Cited by the Examiner

UNITED STATES PATENTS

| 2,628,208 | 2/53 | Loukomsky | 117–138.8 |
| 2,647,296 | 8/53 | Shive. | |
| 2,707,177 | 4/55 | Skiff et al. | 260—42 |

OTHER REFERENCES

"Dispersion Coating" in Organic Fnishing, Dec., 1950, vol., No. 12, pp. 11–15.

RICHARD D. NEVIUS, *Primary Examiner.*